United States Patent [19]

Smith et al.

[11] 4,177,311

[45] Dec. 4, 1979

[54] COMPOSITE FABRIC

[75] Inventors: John B. Smith, Thornhill; Peter W. Bell, Sanquhar; David S. Queen, Sanquhar; John Mitchell, Sanquhar, all of England

[73] Assignee: Sidlaw Industries Limited, Dundee, Great Britain

[21] Appl. No.: 964,513

[22] Filed: Nov. 29, 1978

[30] Foreign Application Priority Data

Nov. 30, 1977 [GB] United Kingdom ............... 49947/77

[51] Int. Cl.$^2$ ............................................... B32B 7/00
[52] U.S. Cl. ................................. 428/246; 156/182; 156/310; 264/135; 264/250; 264/257; 264/258; 428/247; 428/284; 428/286; 428/424; 428/425
[58] Field of Search ................. 428/85, 95, 96, 245, 428/246, 247, 255, 284, 286, 424, 425, 518; 156/182, 310; 264/DIG. 16, 257, 258, 134, 135, 136, 137, 250, 255, 263

[56] References Cited

U.S. PATENT DOCUMENTS

| | | | |
|---|---|---|---|
| 3,360,422 | 12/1967 | Desch | 428/247 |
| 3,823,056 | 7/1974 | Cooney | 428/246 |
| 3,946,097 | 3/1976 | Takahashi et al. | 264/135 |
| 3,962,511 | 6/1976 | Foti | 428/424 |
| 3,984,607 | 10/1976 | Thoma et al. | 428/424 |
| 4,031,181 | 6/1977 | Schaefer et al. | 264/135 |
| 4,053,669 | 10/1977 | Kapsasi et al. | 428/246 |
| 4,116,741 | 9/1978 | Thoma et al. | 428/424 |
| 4,123,488 | 10/1978 | Lawson | 264/135 |

FOREIGN PATENT DOCUMENTS 2012471 6/1972 Fed. Rep. of Germany ........... 428/246

*Primary Examiner*—James J. Bell
*Attorney, Agent, or Firm*—Finnegan, Henderson, Farabow & Garrett

[57] ABSTRACT

A composite fabric comprises a layer of pile-forming material such as a textile bonded to a substrate material by an interlayer of plastics material which is substantially air-free. The interlayer has a density in the range 0.9 to 1.5 gm/cc and the substrate is a slab of deaerated plastics material having a weight up to 6.5 kg/sq. meter (12 lbs/sq. yard) and incorporating a layer of fibrous material such as glass fibre scrim. The pile forming material may be as light as 68 gm/sq. meter (2 oz/sq. yard) and as heavy as 4 kgm/sq. meter (120 oz/sq. yard).

6 Claims, No Drawings

COMPOSITE FABRIC

This invention relates to composite fabrics with particular, but not exclusive, reference to textile and allied soft floor covering materials, and to a method for manufacturing a said fabric.

According to the present invention there is provided a composite fabric comprising a layer of pile-forming material bonded to a substrate material by an interlayer of substantially air-free plastics material having a density in the range 0.9 to 1.5 gm/cc, wherein the substrate material is formed by deaerate plastics material having a weight in the range 0-6.5 kg/sq. meter (0-12 lbs/sq. yard) with a layer of fibrous material embedded therein.

The interlayer may be a thermoplastics material such as P.V.C. or it may be a curable resin such as polyurethane and when used in accordance with the present invention provides improved adhesion between the substrate material and the pile-forming material. The pile-forming material may have a weight of 68 gm/sq meter (2 oz/sq. yard) or greater. For example, the pile-forming material may be a woven fabric having a weight of 4 kgm/sq. meter (120 oz/sq. yard). The pile-forming material may be porous or non-porous and, for example, may incorporate a gelled layer of plastics material. The fibrous material may be a scrim or tissue of glass fibre or textile such as polyester or the like, and preferably is of non-woven construction.

Further, according to the present invention there is provided a method of manufacturing a composite fabric comprising the steps of coating the under-surface of a web of pile-forming material with a liquid layer of substantially air free plastics material having a density in the range 0.9 to 1.5 gm/cc, forming a substrate material by applying a layer of fibrous material to a liquiform layer of deaerated plastics material having a weight in the range 0-6.5 kgm/sq. meter (0-12 lb/sq. yard), thermally treating the substrate material to achieve gellation of the plastics material therein, controlling the viscosity of the plastics material before and during said thermal treatment such that the level to which the fibrous material sinks into the layer of plastics material is determined, applying the coated under-surface of the pile-forming material during said thermal treatment to the substrate material when the plastics material therein is in a semi-gelled state, and maintaining the thermal treatment of the substrate material thereafter for a period sufficient to effect full gellation of both the substrate and the interlayer plastics material in order to form a composite fabric. Pressure may be used to aid adhesion.

Conveniently, said method includes the steps of preparing a liquid body of plastics material having a density in the range 0.9 to 1.5 gm/cc, and maintaining said body in an undisturbed condition for a predetermined period of time during which entrapped air is released to render the body of plastics material substantially air-free. Said predetermined period of time may be shortened by applying a vacuum extraction process to said body but it is not a requirement of the present invention that the interlayer plastics material be deaerated. Thus, the interlayer plastics material may include a small quantity of air, say 5-10% by volume, but is substantially air free in comparison with foamed plastics material where the proportion of included air is of the order of 50% by volume or greater which may be achieved by the use of a foaming agent when the interlayer is a thermoplastics material. One example of a thermoplastics formulation which may be used in accordance with the present invention is:

| Materials | Parts by Weight |
|---|---|
| PVC homo polymer | 56 |
| PVC co polymer | 24 |
| PVC granular homo polymer | 30 |
| Plasticiser | 80 |
| Calcium Carbonate | 56 |
| Stabiliser | 2 |
| Viscosity Depressant | 2 |

The present invention conveniently may be performed on the apparatus described in our U.K. Patent Specification No. 1,432,781 the particulars of which are incorporated herein by reference or on a suitably modified version of this apparatus.

The pile layer may be presented in continuous roll or runner form or discontinuous pelt, mat (or sheet) form.

What is claimed is:

1. A composite fabric comprising a layer of pile-forming material bonded to a substrate material by an interlayer of substantially air-free plastics material having a density in the range 0.9 to 1.5 gm/cc, wherein the substrate material is formed by deaerated plastics material having a weight in the range 0-6.5 kg/sq. meter (0-12 lbs/sq. yard) with a layer of fibrous material embedded therein.

2. A composite fabric as claimed in claim 1, wherein said interlayer is a thermoplastics material incorporating up to 10% air by volume.

3. A composite fabric as claimed in either preceding claim, wherein the pile forming material has a weight exceeding 68 gm/sq meter (2 oz/sq. yard).

4. A composite fabric as claimed in claim 3, wherein the pile forming layer is a fabric.

5. A method of manufacturing a composite fabric comprising the steps of coating the under-surface of a web of pile-forming material with a liquid layer of substantially air free plastics material having a density in the range 0.9 to 1.5 gm/cc, forming a substrate material by applying a layer of fibrous material to a liquiform layer of deaerated plastics material having a weight in the range 0-6.5 kgm/sq. meter (0-12 lb/sq. yard), thermally treating the substrate material to achieve gellation of the plastics material therein, controlling the viscosity of the plastics material before and during said thermal treatment such that the level to which the fibrous material sinks into the layer of plastics material is determined, applying the coated under-surface of the pile-forming material during said thermal treatment to the substrate material when the plastics material therein is in a semi-gelled state, and maintaining the thermal treatment of the substrate material thereafter for a period sufficient to effect full gellation of both the substrate and the interlayer plastics material in order to form a composite fabric.

6. The method as claimed in claim 5, including the steps of preparing a liquid body of plastics material having a density in the range 0.9 to 1.5 gm/cc. and maintaining said body in an undisturbed condition for a predetermined period of time to release entrapped air and render the body of plastics material substantially air-free.

* * * * *